United States Patent [19]

Hehl

[11] Patent Number: 4,808,103
[45] Date of Patent: Feb. 28, 1989

[54] INJECTION MOLDING MACHINE HAVING AN INJECTION NOZZLE CONTROL DEVICE

[76] Inventor: Karl Hehl, Arthur-Hehl-Strasse 32, D-7298 Lossburg 1, Fed. Rep. of Germany

[21] Appl. No.: 168,771

[22] Filed: Mar. 16, 1988

[30] Foreign Application Priority Data

Mar. 16, 1987 [DE] Fed. Rep. of Germany ....... 3708434

[51] Int. Cl.$^4$ ............................................. B29C 45/20
[52] U.S. Cl. ................................ 425/190; 425/192 R; 425/564; 425/574
[58] Field of Search ................... 425/185, 190, 192 R, 425/574, 564

[56] References Cited

U.S. PATENT DOCUMENTS 4,708,622 11/1987 Hehl .................................. 425/185

FOREIGN PATENT DOCUMENTS 1439001 2/1961 France .
1306697 2/1973 Japan .

Primary Examiner—Jay H. Woo
Assistant Examiner—Timothy W. Heitbrink
Attorney, Agent, or Firm—Spencer & Frank

[57] ABSTRACT

An injection molding machine includes a plasticizing cylinder, a shutoff nozzle mounted at the front of the plasticizing cylinder, a shutoff nozzle control for opening or closing the shutoff nozzle, and a carrier block including a bore for receiving a rear terminus of the plasticizing cylinder. The shutoff nozzle control includes a first power device supported in the carrier block; a force-transmitting element connected to the shutoff nozzle and extending therefrom to the first power device; and a coupling arrangement including a movable coupling mechanism for placing the force-transmitting element into an engaged or a disengaged position relative to the first power device, whereby in the disengaged position the plasticizing cylinder is, together with the force-transmitting element, movable away from the first power device and the carrier block. The coupling arrangement further has a second power device connected to the coupling mechanism for placing the coupling mechanism into the engaged or disengaged position.

20 Claims, 12 Drawing Sheets

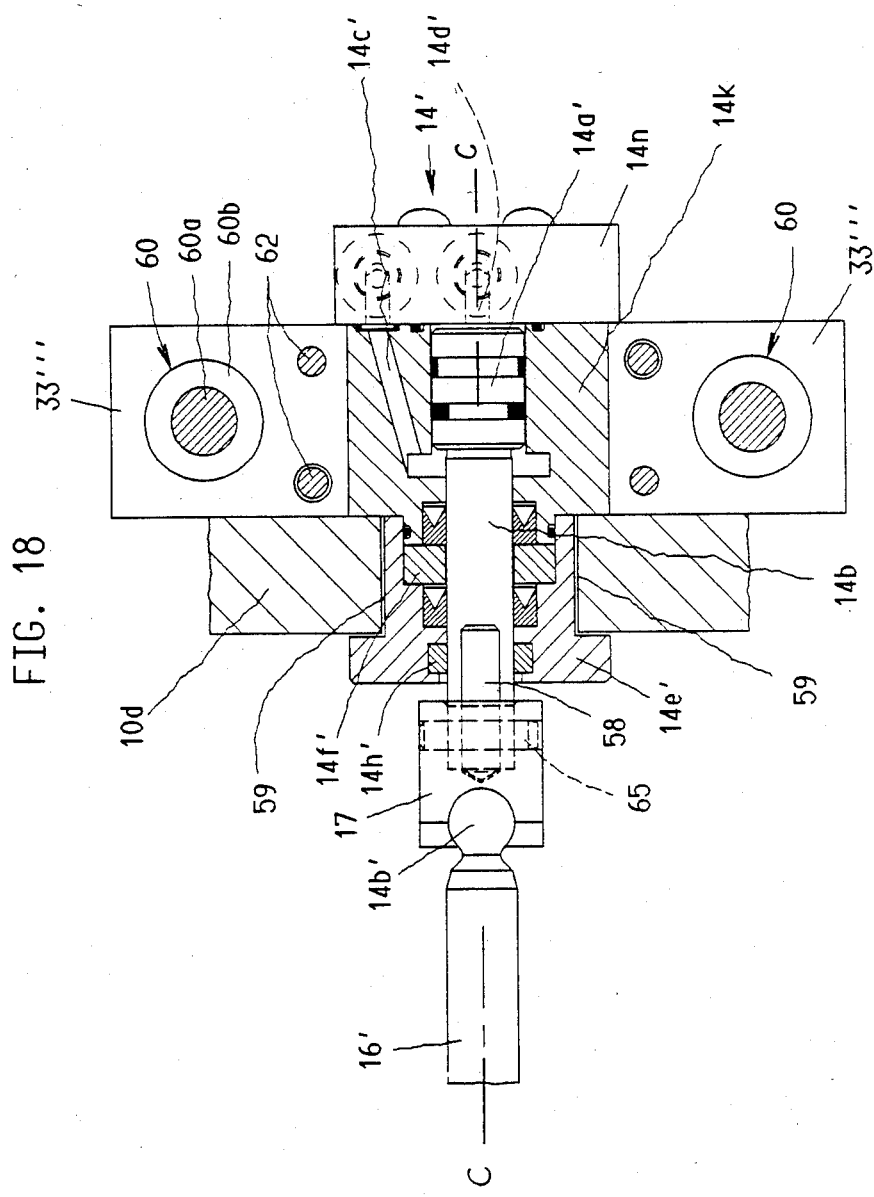

INJECTION MOLDING MACHINE HAVING AN INJECTION NOZZLE CONTROL DEVICE

BACKGROUND OF THE INVENTION

This invention relates to an injection molding machine which has an injection molding unit displaceable on horizontal guides by a hydraulic drive assembly. The injection molding unit includes a plasticizing unit which has a plasticizing cylinder accommodating a feed screw which is rotatable and axially shiftable therein. The plasticizing cylinder is provided at its frontal end, that is, at its discharge terminus, with either a continuously open nozzle or a shutoff nozzle which can be opened or closed by a control device. At the opposite, rear terminal portion the plasticizing cylinder is releasably locked into a central opening of a carrier block of the injection molding unit. For purposes of replacement the plasticizing cylinder may be removed from the central bore in an axial direction relative to the carrier block by a hydraulic drive.

Injection molding units of the above-outlined type are known and are disclosed, for example, in U.S. Pat. No. 4,708,622, issued Nov. 24, 1987. Such injection molding units may operate with a plasticizing cylinder which may have either an open nozzle or a shutoff nozzle because a nozzle exchange may be carried out without appreciable loss of time within the framework of an automatic replacement of the plasticizing cylinder.

In many cases open nozzles are preferred because of their substantial versatility in connection with the use of various synthetic materials and because of their disturbance-free operation. They find application in connection with decompression devices which, by virtue of an axial reverse stroke of the feed screw, relieve the plastic material in the plasticizing cylinder from pressure prior to removing the plasticizing cylinder from the remaining components of the injection molding unit. This prevents an undesired escape of the plastic material from the nozzle.

Shutoff nozzles are required for special tasks in injection molding technology, for example, for the processing of polyamides. Such nozzles make possible, for example, a high injection velocity in the initial phase of the injection process when the plastic material in the plasticizing cylinder is accordingly pressurized prior to opening the nozzle.

Furthermore, it is known, for example, from French Pat. No. 1,439,001 or German Utility Model Pat. No. 7,020,969 to control the shutoff needle of the shutoff nozzle by a two-armed lever with the aid of a hydraulic power cylinder which is secured directly to the plasticizing cylinder in the zone of the shutoff nozzle.

SUMMARY OF THE INVENTION

It is an object of the invention to provide an improved injection molding unit of the above-outlined type, that is, wherein the plasticizing cylinder for facilitating its replacement, may be automatically separated from the carrier block. The invention seeks to improve the conventional arrangement such that as a result of the provision of a relatively limited and therefore simply supportable component assembly, the two variants of the injection molding unit, that is, one with an open nozzle and another with a shutoff nozzle may be produced economically according to modular construction principles. The first variant has the structural preconditions for a retrofitting to obtain the second variant with very little assembly work.

This object and others to become apparent as the specification progresses, are accomplished by the invention, according to which, briefly stated, the injection molding machine includes a plasticizing cylinder, a shutoff nozzle mounted at the front of the plasticizing cylinder, a shutoff nozzle control for opening or closing the shutoff nozzle, and a carrier block including a bore for receiving a rear terminus of the plasticizing cylinder. The shutoff nozzle control includes a first power device supported in the carrier block; a force-transmitting element connected to the shutoff nozzle and extending therefrom to the first power device; and a coupling arrangement including a movable coupling mechanism for placing the force-transmitting element into an engaged or a disengaged position relative to the first power device, whereby in the disengaged position the plasticizing cylinder is, together with the force-transmitting element, movable away from the first power device and the carrier block. The coupling arrangement further has a second power device connected to the coupling mechanism for placing the coupling mechanism into the engaged or disengaged position.

According to the invention, the control cylinder for the shutoff nozzle is relocated from the plasticizing cylinder into the supply block (carrier block) of the injection molding unit so that during the release motion of the plasticizing cylinder, during the course of a replacement operation, not only the carrier block but also the control cylinder will be separated from the plasticizing cylinder. A precondition therefor is the possibility of an automatic disengagement of the control cylinder from the shutoff nozzle; an aspect which may be integrated into the overall program of the computer associated with the injection molding machine. In this manner the different requirements of the customers for a processing of a synthetic material with an open nozzle or a shutoff nozzle may be better taken into account. If, for example, in case of a particular customer who has been working with an injection molding unit with an open nozzle the requirement arises that he deliver different products which can be manufactured only with an injection molding unit having a shutoff nozzle, he can, thanks to the invention, convert the available injection molding unit with extremely small financial and assembly outlay, into an injection molding unit with a shutoff nozzle. To achieve such a conversion, the customer, after nozzle replacement, simply installs the nozzle control component that may be coupled to or uncoupled from the shutoff nozzle, in the already-provided receiving locations of the injection molding unit with a few manual operations performed in the plan itself.

In the manufacturing process of the injection molding machine the availability of both variants means that only a relatively limited stock inventory is needed, and a rational serial manufacture based on the modular construction principle may be carried out, wherein the associated component assortment comprises essentially the following structural components: the carrier blocks; the components for the associated locking devices for the axial locking of the plasticizing cylinder; the plasticizing cylinder in various embodiments corresponding to practical requirements; shutoff nozzles and open nozzles which are connectable selectively and arbitrarily with the plasticizing cylinders as well as components for the shutoff nozzle control cylinder (first power device) and the components for the force transmission from the control cylinder to the shutoff nozzle as well as components of the coupling mechanism and the coupling cylinder (second power device).

All the above-listed components can be standardized, that is, they may be used for different embodiments of plasticizing cylinders and shutoff nozzles. Upon replacement of the plasticizing unit the latter is, for undergoing the various transport motions, freed from the control cylinder which remains in a protected position in the carrier block inside the injection molding unit.

The relocation of the shutoff nozzle control cylinder from the zone of the shutoff nozzle according to the invention is of particular advantage also for another reason: during the injection molding operation the shutoff nozzle often reaches temperatures at which any oil leaked from the control cylinder is immediately ignited. In view of the stringent safety requirements in many countries and the corresponding potential damage or injury claims involved therewith, a removal of the control cylinder from the danger zone of the shutoff nozzle constitutes a significant improvement. While such a relocation of the control cylinder to the carrier block involves a certain additional technological outlay and requires force-transmitting and coupling means, in the overall concept of the serial manufacture an overall cost reduction is feasible by making the basic variant (with open nozzle) adaptable to a very simple conversion or retrofitting to obtain an injection molding unit with a shutoff nozzle. This is so, because the variant with a shutoff nozzle needs only a few additional components when changed from the variant with an open nozzle.

In one preferred embodiment, the piston-and-cylinder unit serving as a coupling cylinder performs a dual function, inasmuch as the unit controls the coupling elements as well as the immobilization of the plasticizing cylinder for setting the latter free from the carrier block as the carrier block is displaced rearwardly. In another preferred embodiment, the piston-and-cylinder unit controls the coupling as well as the slide for an axial locking of the plasticizing cylinder. Also, a relocation of the control cylinder into the carrier block is a precondition for the provision of a protective casing which surrounds the plasticizing cylinder and which significantly facilitates a replacement of the plasticizing cylinder without the carrier block.

BRIEF DESCRIPTION OF THE DRAWING

FIG. 18 is a sectional view taken along line XVIII-—XVIII of FIG. 16.

DESCRIPTION OF THE PREFERRED EMBODIMENTS

Figure 1:
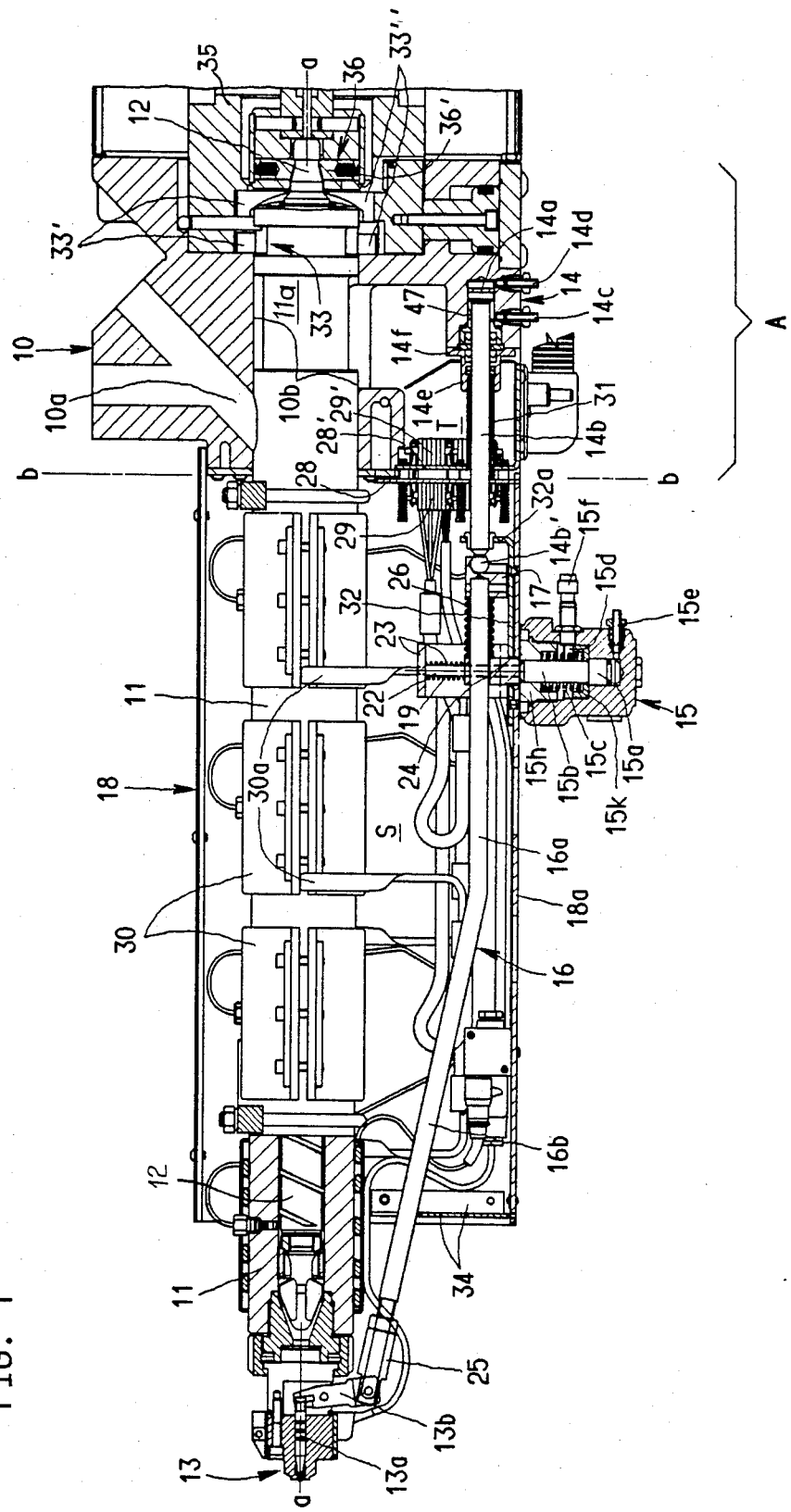
FIG. 1 is a sectional side elevational view of a frontal part of an injection molding unit, incorporating a preferred embodiment of the invention and illustrating a nozzle control cylinder in the coupled state.

In both embodiments which will be described in connection with FIGS. 1-13 on the one hand and FIGS. 14-18 on the other hand, identically functioning components are designated with the same reference numeral but are, in FIGS. 14-18 (relating to the second embodiment), provided with distinguishing suffixes. In the first part of the description which follows and which is applicable to both embodiments, such suffixes are omitted.

Figure 2:
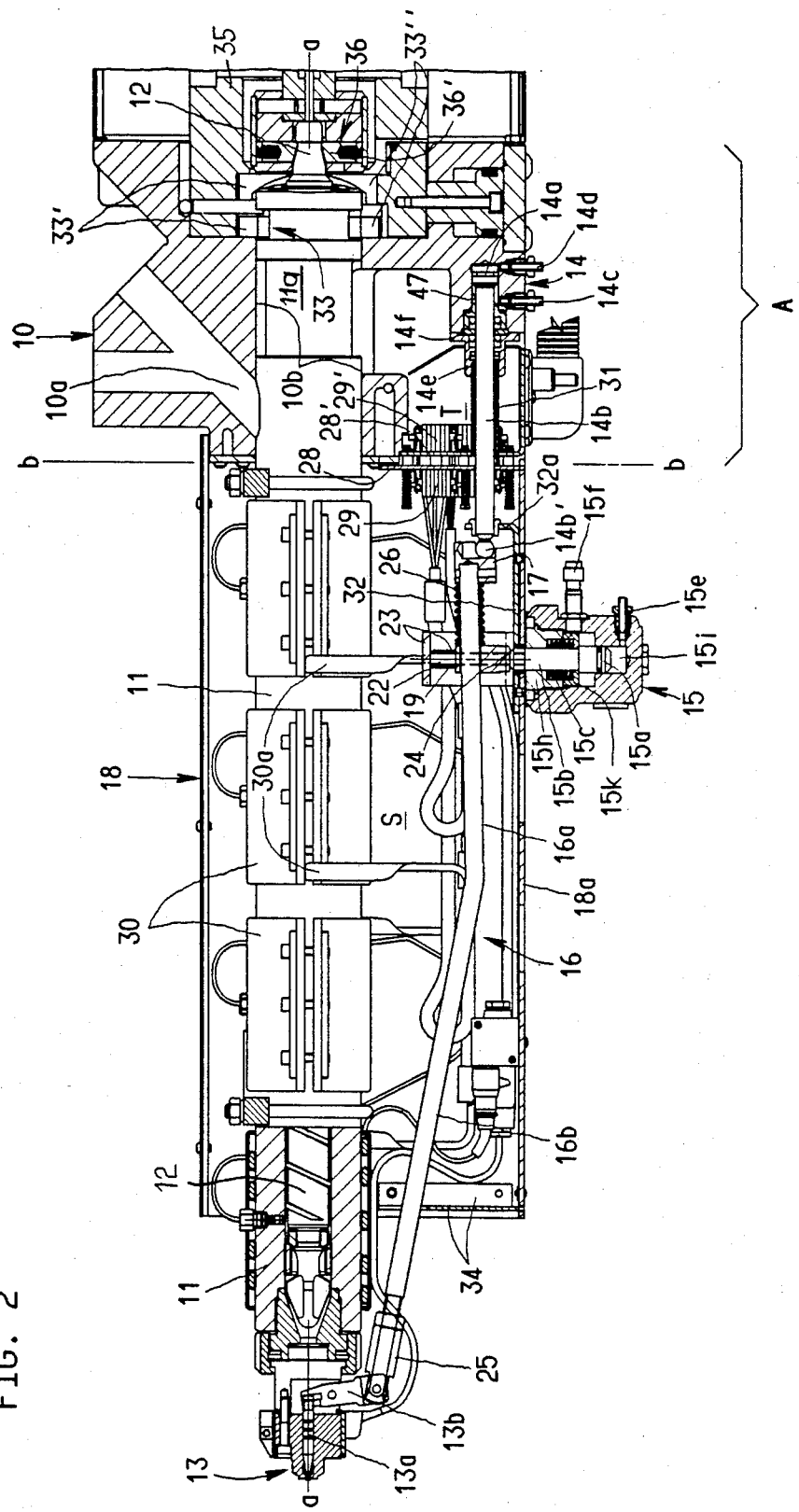
FIG. 2 is a view similar to FIG. 1, illustrating the nozzle control cylinder in an uncoupled state.

With particular reference to FIGS. 1 and 2, the plasticizing cylinder 11 of the plasticizing unit is received, at its rearward portion, by a central bore 10b provided in a carrier block 10 which also has a filling chute 10a communicating with the bore 10b and serving for supplying the synthetic material thereto. The plasticizing cylinder 11 is provided with a rotatable and axially shiftable conveyor screw 12 and has at its forward end a shutoff nozzle 13.

Figure 5:
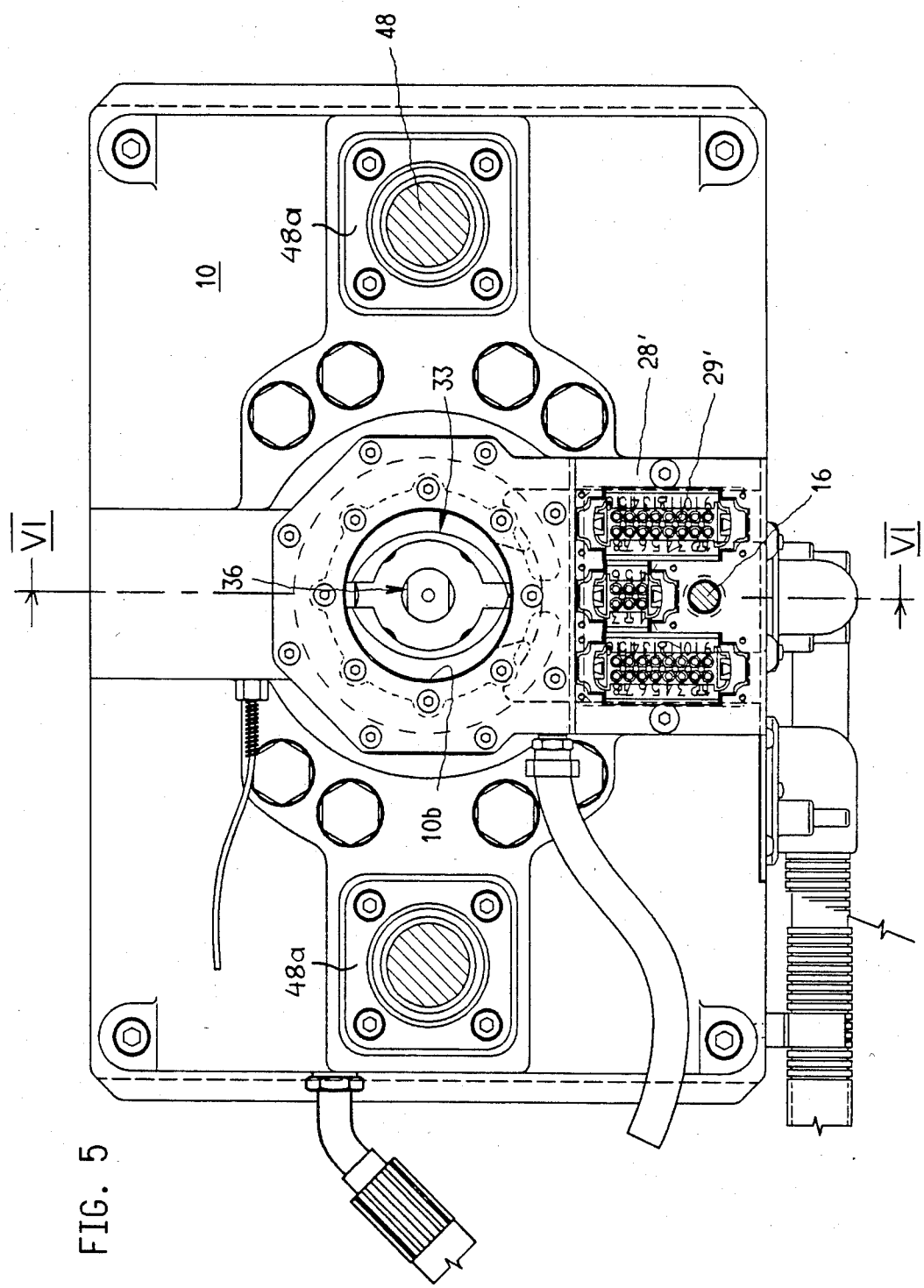
FIG. 5 is an end elevational view of the structure shown in FIG. 6, as viewed in the direction of arrow Z of FIG. 6.

Also referring to FIG. 5, the injection molding unit is shiftable by means of a hydraulic drive on and along stationary, horizontal columns 48 and is thus attachable to or movable away from a mold assembly. The drive arrangement provided therefor comprises hydraulic cylinders which are parts of the injection molding unit. The end plate of the hydraulic cylinders is designated at 48a. The pistons operating in the hydraulic cylinders are fixedly mounted on the respective columns 48 while the cylinders coaxially surround the columns 48 and are fixedly connected with the carrier block 10. The plasticizing unit is, by virtue of a rearwardly directed stroke of the drive assembly, movable out of the central bore 10b of the carrier block 10 and thus may be freed therefrom for purposes of replacement. The plasticizing cylinder 11, when situated in the working position in the central bore 10b, is lockable automatically by radially guided slides of a hydraulically operated locking mechanism 33.

Figure 6:
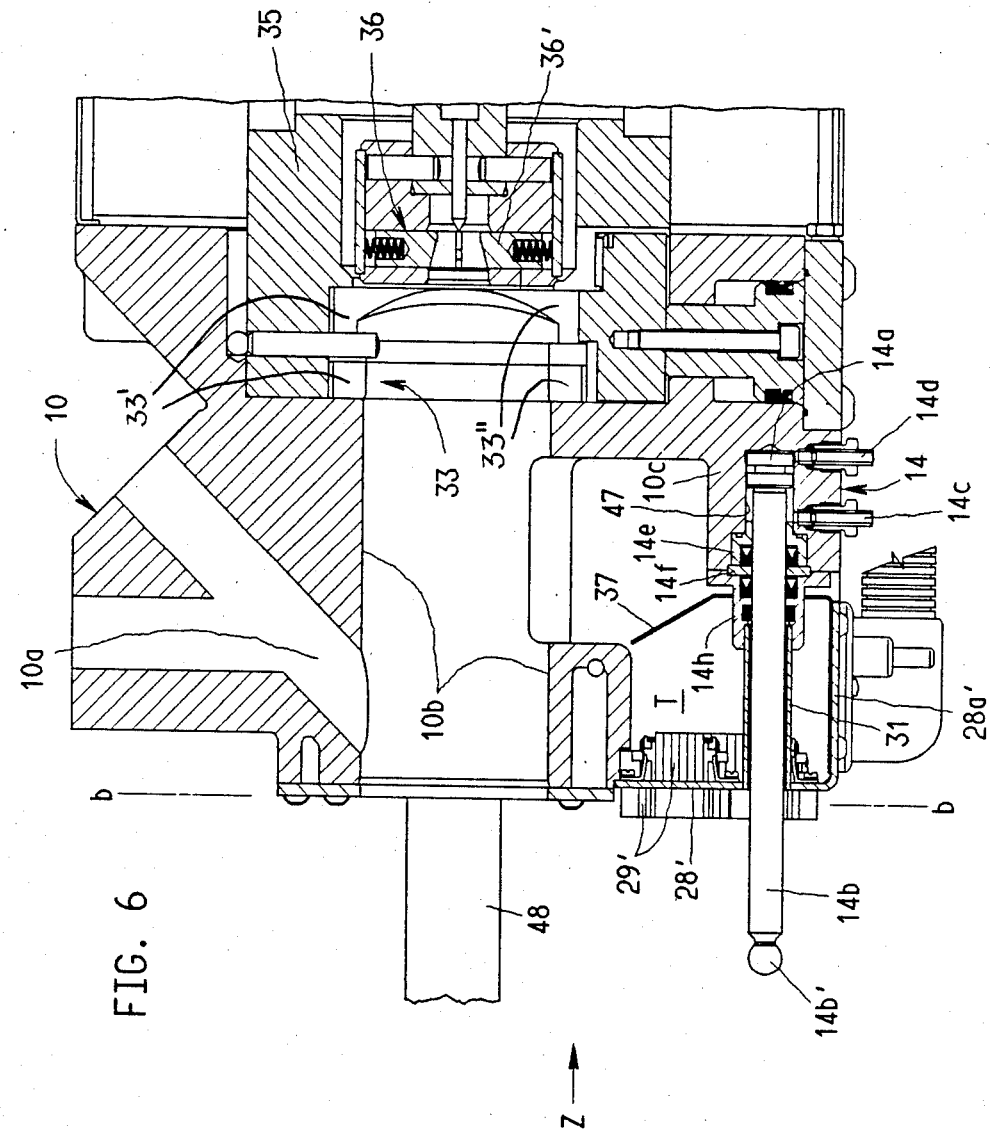
FIG. 6 is a sectional view taken along line VI-VI of FIG. 5.

Reverting once more to FIGS. 1 and 2 and also referring to FIG. 6, a hydraulic control cylinder 14 which operates a control needle 13a of the shutoff nozzle 13 via a two-arm lever 13b to assume a closed (shutoff) position or an open position, is mounted in the carrier block 10. The control cylinder 14 forms a travelling unit with the carrier block 10 during the separating motion of the plasticizing cylinder 11 from the carrier block 12. The control cylinder 14 is articulated to the lever 13b by means of at least one force-transmitting element, such as a rod 16.

Figure 3:
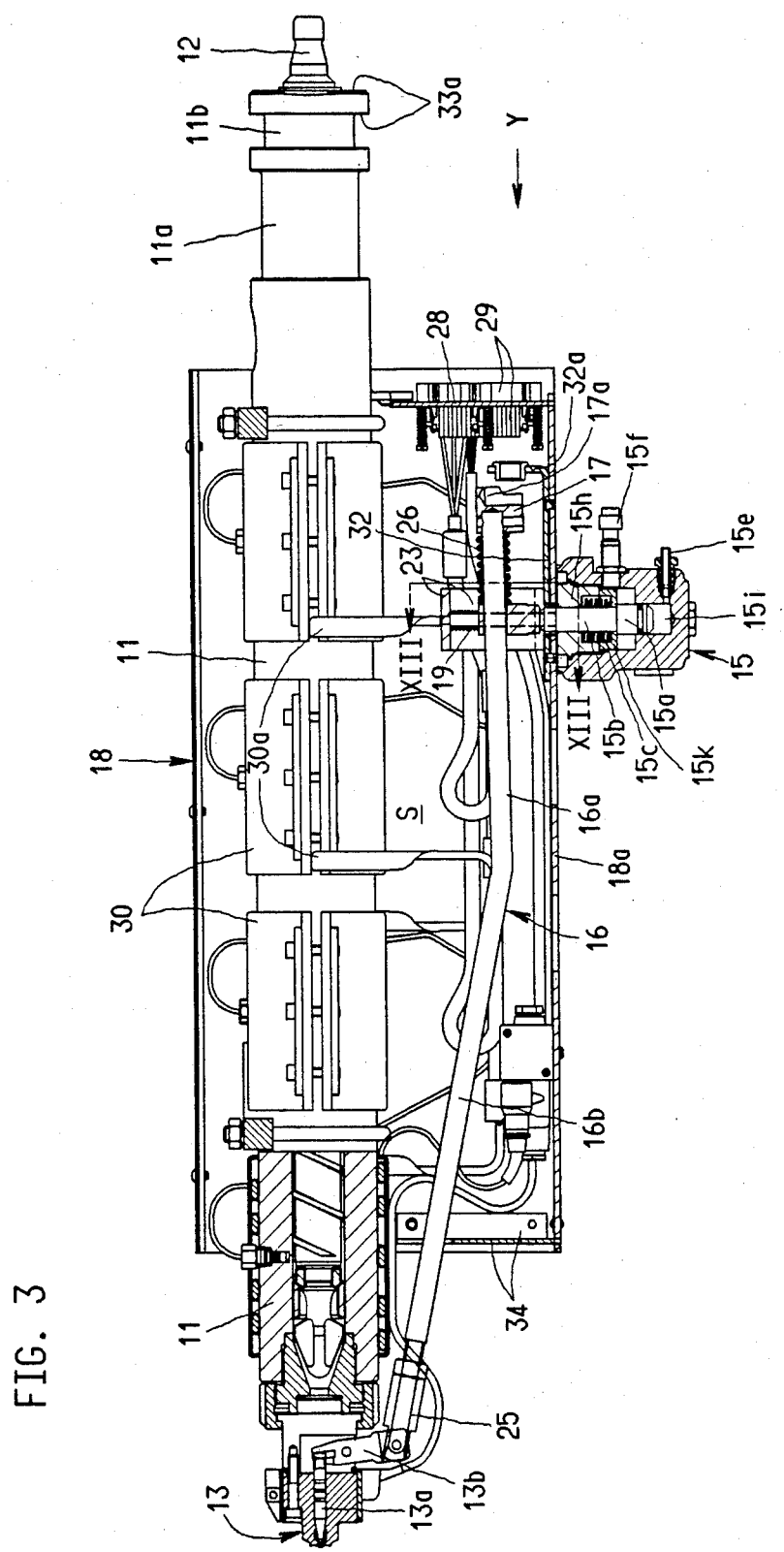
FIG. 3 is a longitudinal elevational view, partially in section, of a plasticizing unit shown in FIGS. 1 and 2, separated from the injection molding unit.

A hydraulically operable coupling device for the automatic separation of the control cylinder 14 from the force-transmitting rod 16 has a hydraulic cylinder which is a coupling cylinder designated at 15 in FIGS. 1, 2 and 3 (first embodiment) and is designated at 60 in FIG. 18 (second embodiment), is oriented approximately perpendicularly to the control cylinder 14. The coupling parts 17 and 14b' of the coupling device mounted on the free end of the force-transmitting rod 16 and the piston rod 14b of the control cylinder 14 ar arranged in the vertical symmetry plane c—c (FIG. 4) of the injection molding unit. These coupling components as will be described in more detail in connection with FIGS. 7-12, are movable into and out of a coupling position—in which they mutually interengage—by virtue of a relative motion oriented radially to the plasticizing cylinder 11 and effected by the coupling cylinder 15.

The control cylinder 14 is situated in the vertical symmetry plane c—c of the injection molding unit in a niche T of the carrier block 10, underneath that portion 11a of the plasticizing cylinder 11 which is received in the central bore 10b. The niche T is covered by a terminal socket carrying plate 28'. The force-transmitting rod 16 is biased by the axially working force of a spring 26 which is countersupported directly on the plasticizing cylinder 11 and which presses the nozzle needle 13a into the closing position.

In the description which follows, the characteristic components of the first preferred embodiment shown in FIGS. 1-13 will be described.

Referring in particular to FIGS. 1, 2 and 6, the locking slides 33', 33" are situated in a cylindrical guide member 35 arranged coaxially with the central bore 10b. The guide member 35 is received in a form-fitting manner in a rearward recess of the carrier block 10. A locking device 36 including bolts 36' for the feed screw 12 is received in a hollow space of the guide member 35.

The control cylinder 14 for the shutoff nozzle 13 is arranged in the carrier block 10 in the zone A underneath the central bore 10b. The piston 14a of the control cylinder 14 is received in a blind bore 47 of the carrier block 10 as may be observed particularly in FIG. 6. The blind bore 47 is provided underneath the portion 11a of the plasticizing cylinder 11 (when received in the central bore 10b), in a projecting portion 10c situated in a niche T of the carrier block 10. The two cylinder chambers situated on opposite sides of the piston 14a may be charged with pressurized oil introduced through hydraulic nipples 14c and 14d, respectively. The nozzle-side cylinder chamber (to the left of the piston 14a as viewed in FIG. 6) is closed off by a cylinder cover 14e which is situated within the component 10c of the carrier block 10 and which surrounds with an axial flange an annular chamber in which a sealing ring is disposed. The sealing ring is separated by means of an annular disc 14f from a further sealing ring which, in turn, is received in a bowl-shaped sealing sleeve 14h. The piston rod 14b of the control cylinder 14 terminates in a coupling head 14b' and is, within the niche T surrounded by a protective sleeve 31.

Figure 4:
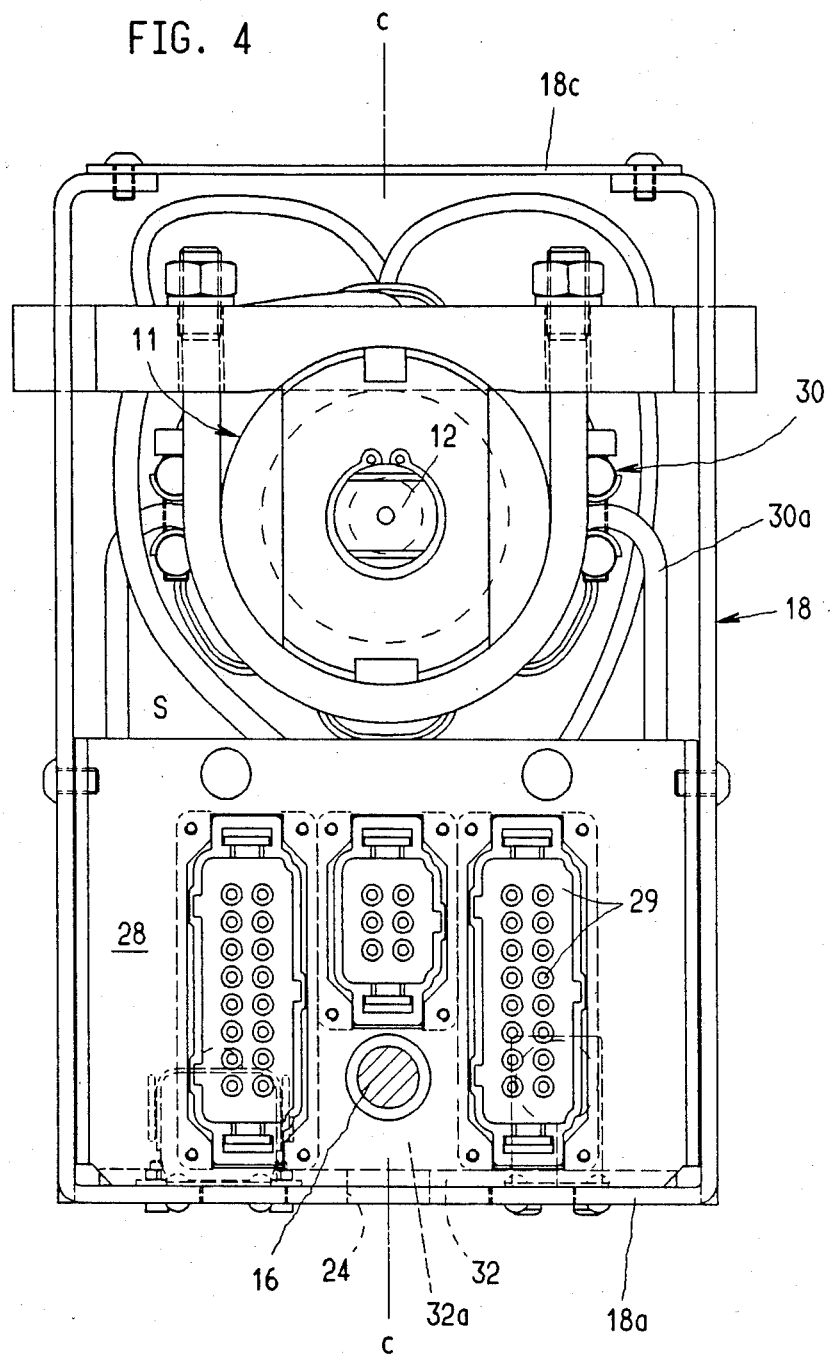
FIG. 4 is an enlarged end elevational view of the structure shown in FIG. 3, as viewed in the direction of arrow Y of FIG. 3.
Figure 7:
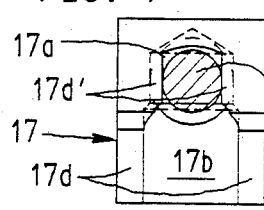
FIGS. 7 and 8 are respective end and side elevational views of a coupling mechanism forming part of a preferred embodiment of the invention, illustrating a first operational position.
Figure 8:
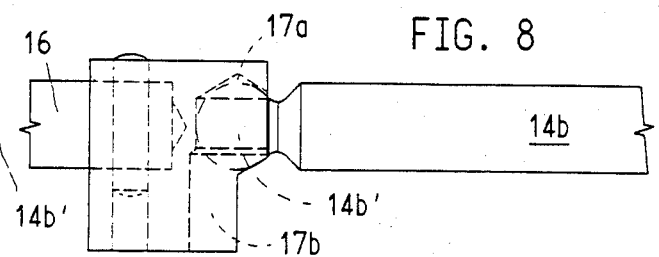
Figure 9:
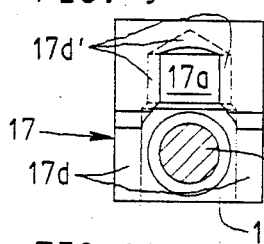
FIGS. 9 and 10 are respective end and side elevational views of the coupling mechanism of FIGS. 7 and 8, illustrating a second operational position.
Figure 10:
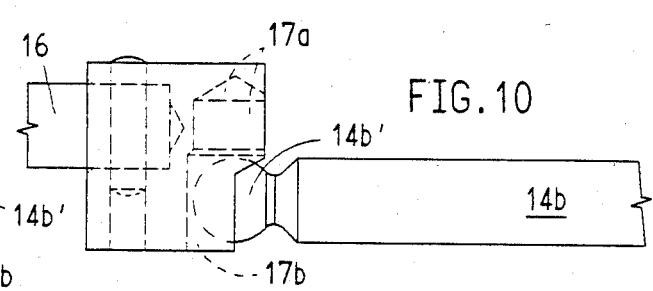
Figure 11:
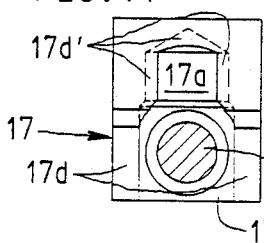
FIGS. 11 and 12 are respective end and side elevational views of the coupling mechanism of FIGS. 7 and 8, illustrating a third operational position.
Figure 12:
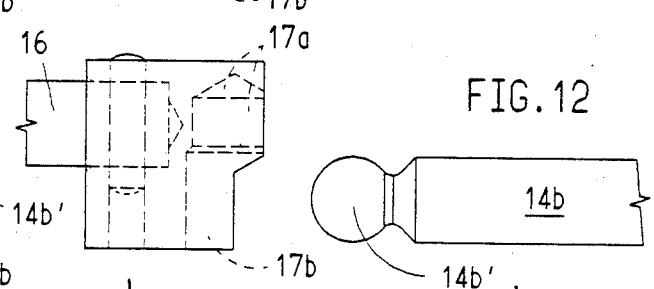
Figure 13:
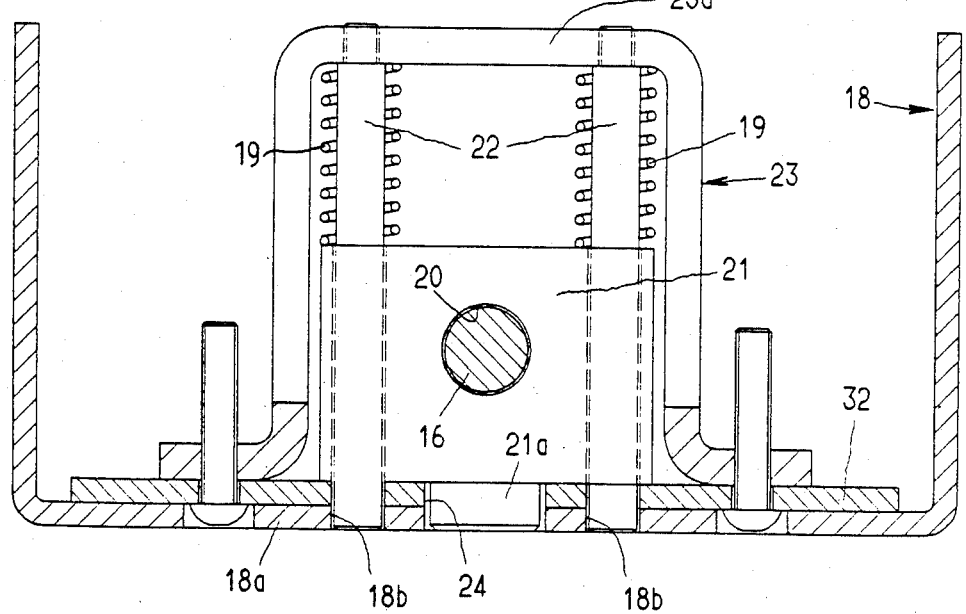
FIG. 13 is an enlarged sectional view taken along line XIII—XIII of FIG. 3.

In the coupling position shown in FIGS. 7 and 8, the coupling head 14b' is engaged from behind by a coupling element 17 secured to the free end of the force-transmitting rod 16. The generally square-shaped coupling element 17 is, on the coupling side, provided with a vertical guide track 17b which is bounded on both sides by wall portions 17d and which narrows on the top to form a coupling cage 17a. If the coupling head 14b' and the coupling element 17 are at a spaced relationship with respect to one another as illustrated in FIGS. 9 and 10, the control cylinder 14 is separated from the shutoff nozzle 13. Therefore, the coupling cylinder 14 may be pulled off rearwardly, together with the carrier block 10, from the coupling element 17 situated within the confines of the plasticizing unit as it may be observed in FIG. 12. Such a removal (pull-off) is comprised in the initial phase for a replacement of the plasticizing unit subsequent to releasing the locking device 33, 36. In the coupling position according to FIGS. 7 and 8, the coupling head 14b' is engaged from behind by the undercut flanks 17d' of the coupling element 17. As a result, the release of the coupling may take place with the aid of a radial motion of the coupling element 17 in a direction perpendicularly to the injection axis a—a (FIGS. 1, 2). Such a motion occurs with a simultaneous pivotal motion of the rod 16 carrying the coupling element 17. For this purpose, the stationary coupling cylinder 15 which is supported on the columns 48 (FIGS. 5, 6) and/or on the machine frame, engages the rod 16 which is supported with a play in a bore 20 of a sled 21 guided in vertical guide pins 22, as shown in FIG. 13. The sled 21 may be lifted off the coupling cylinder 15 against the force of return springs 19. The guide pins 22 are, at their upper end, fixedly connected with the web 23a of a U-shaped yoke 23 releasably mounted on a protective casing 18 surrounding the plasticizing cylinder 11. The guide pins 22 project, with their lower ends, loosely and in a centered manner into bores 18b of the horizontal wall of the casing 18 which has a U-shaped cross section as also shown in FIG. 4. The vertical sides of the casing 18 are connected at the top by a horizontal cover plate 18c secured to horizontally bent upper edge zones of the vertical side walls. The cover plate 18c complements the casing 18 to a rectangular tube which spacedly surrounds the plasticizing cylinder 11 while forming a protective chamber S for the coupling device. The plasticizing cylinder 11 which is equipped with a heating device 30 having heating strips 30a formed as heater coils is connected with the rectangular casing 18 in a known manner as disclosed in U.S. patent application Ser. No. 876,806 filed June 20th, 1986, now U.S. Pat. No. 4,731,005.

Referring once again to FIGS. 1, 2, 3 and 13, the cylinder bore in the cylinder proper of the coupling cylinder 15 has a lower portion of smaller inner width in which there is formed a cylinder chamber 15i. The unilaterally chargeable piston 15a projects into the part of the smaller inner width of the cylinder to bound the cylinder chamber 15i. The actuating stroke of the piston 15a is effected against the force of a coil spring 15c which surrounds the piston rod 15b. The spring 15c is, at the rear side, countersupported on the annular shoulder of a centering sleeve 15h surrounding the piston rod 15b and at the front engages the piston 15a with the intermediary of an annular disc 15k.

An "initiator" 15f which, in a coupling position (FIG. 1) bounds an annular chamber 15d with its radial end face, monitors the operation of the coupling cylinder 15 by applying corresponding monitoring signals to a computer. Upon charging (energization) of the piston 15a with a pressure medium introduced through the nipple 15e there is obtained an upward stroke of the piston 15a, while at the same time the return spring 15c is compressed. During such stroke the frontal end of the piston rod is introduced into the arresting hole 24 provided in the horizontal bottom wall 18a of the protective casing 18 for an axial immobilization of the plasticizing unit. Such an axial arrest is a precondition for a return stroke of the injection molding unit for the purpose of freeing the plasticizing cylinder 11 from the remaining components of the plasticizing unit. At the same time, by virtue of the above-noted vertical stroke of the piston 15a, the sled 21 which rests by means of a lug 21a on the frontal radial face of the piston rod 15b, is lifted thereby against the force of the springs 19, also moving the rod 16 upwardly. As a result, the coupling element 17 is guided from a coupling position according to FIGS. 7 and 8 into an uncoupled position according to FIGS. 9–12.

The rod 16 has a rearward portion 16a which extends parallel to the lower horizontal wall 18a of the protective casing 18. In a frontal part 16b the rod 16 forms an angle to the horizontal and extends obliquely upwardly in the direction of the shutoff nozzle 13. The frontal portion 16b is articulated by a tension lock 25 to the lever 13b. A spring 26 surrounds the end part of the rearward portion 16a of the rod 16 and is countersupported at the sled 21. At its other end the spring 26 exerts a force on the coupling element 17. This ensures that the closing needle 13a is held in the closed position under the effect of the spring 26 after the separation of the rod 16 from the hydraulic nozzle control unit 14.

Also referring to FIG. 6, the niche T is bounded by an angled terminal-carrying plate 28' whose vertical leg carries the plugs 29' for the cylinder heater 30 and whose horizontal leg 28a' closes off the niche T at the bottom. The piston rod 14b projects into the protective chamber S of the plasticizing unit. The protective chamber S, as noted earlier, is bounded by the protective casing 18 and is closed off at the front by a closure plate 34 and at the rear by the terminal socket carrier plate 28 for the appropriate plugs 29 of the cylinder heater 30. The terminal-carrying plates 28, 28' are situated generally in the plane b—b of the frontal face of the carrier block 10.

As seen in FIGS. 1 and 2, the end of the piston rod 14b which projects into the protective chamber S is guided in an opening of the vertical leg 32a of a protective angle member 32 secured to the wall 18a of the protective casing 18.

Upon depressurization of the cylinder chamber 15i the piston rod 15b is moved downwardly from the arresting position shown in FIG. 1 under the effect of the return spring 19 and the spring 15c. As a result, the rod 16 and the coupling element 17 are lowered and thus the coupling element moves into its lower position in which it operatively couples the piston rod 14b to the force-transmitting rod 16.

As seen in FIGS. 4 and 5, the terminals 29, 29' are situated in vertical columns and are grouped symmetrically to the vertical symmetry plane c—c.

When a plasticizing cylinder is being converted from an open nozzle construction into a shutoff nozzle construction upon replacement of the appropriate nozzle, the following components may be introduced with a minimum assembling operation into the plasticizing unit: the component group formed of the piston 14a, the piston rod 14b and the coupling head 14b' and further, the device with the sled 21 illustrated in FIG. 13 for the vertical guidance of the rod 16 and the rod 16 proper with the tension lock 25.

In the description which follows, the characteristic components and relationships of the second embodiment illustrated in FIGS. 14–18 will be set forth.

Figure 14:
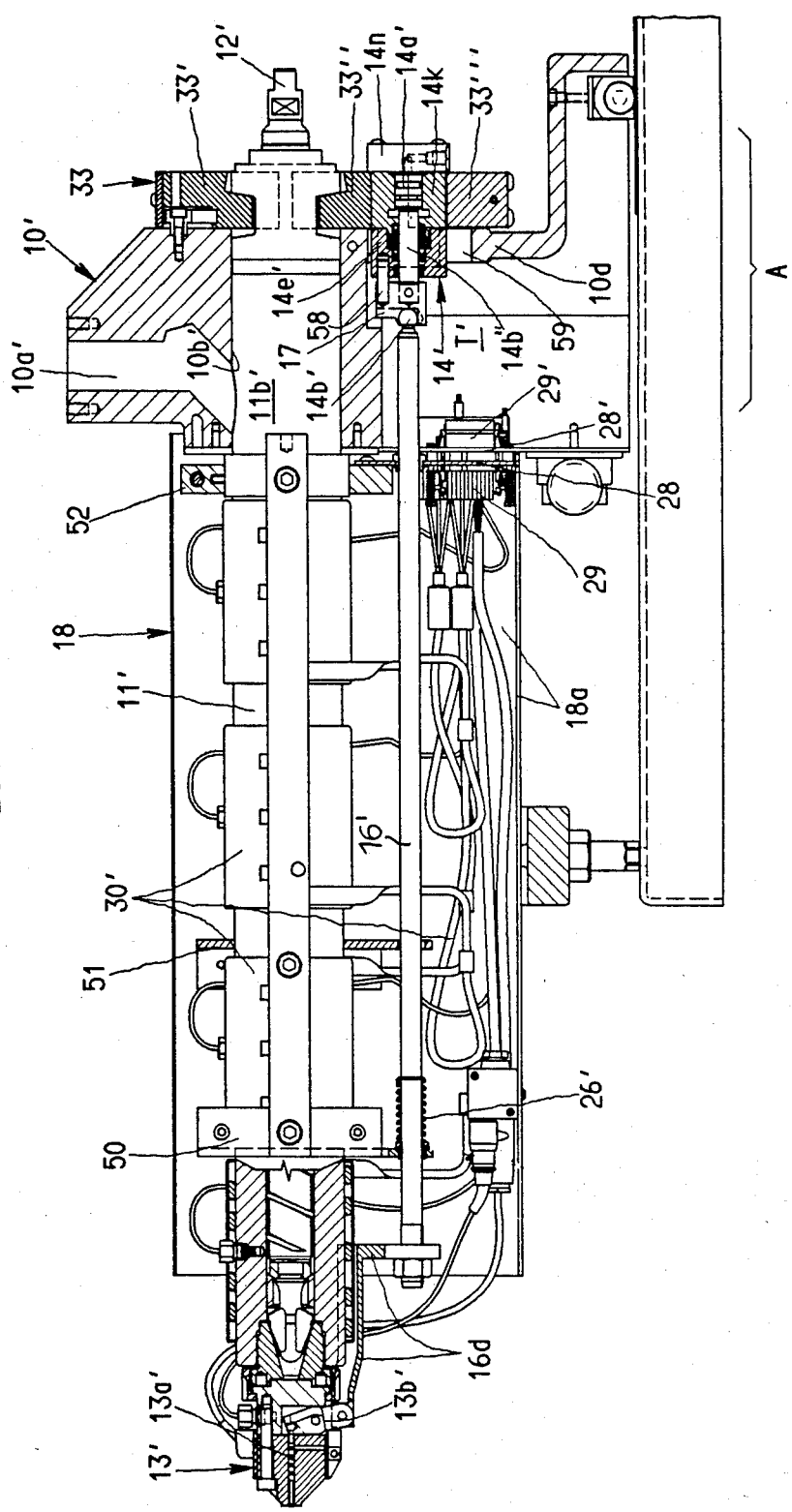
FIG. 14 is a sectional side elevational view of a frontal part of an injection molding unit, incorporating a second preferred embodiment of the invention and illustrating a nozzle control cylinder in the coupled state.
Figure 16:
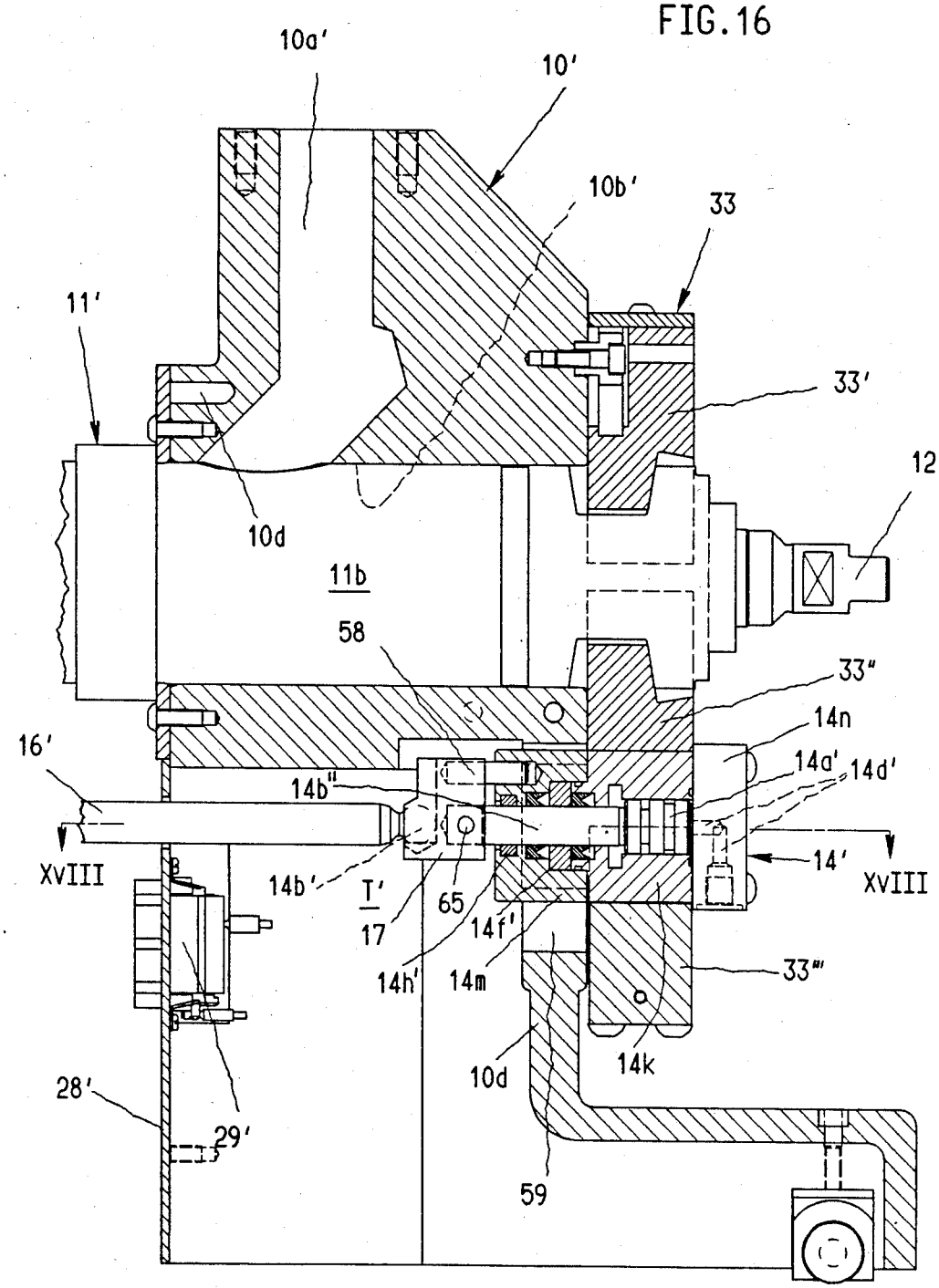
FIG. 16 is a sectional side elevational detail of the embodiment shown in FIG. 14, showing a nozzle control cylinder in a coupled position
Figure 17:
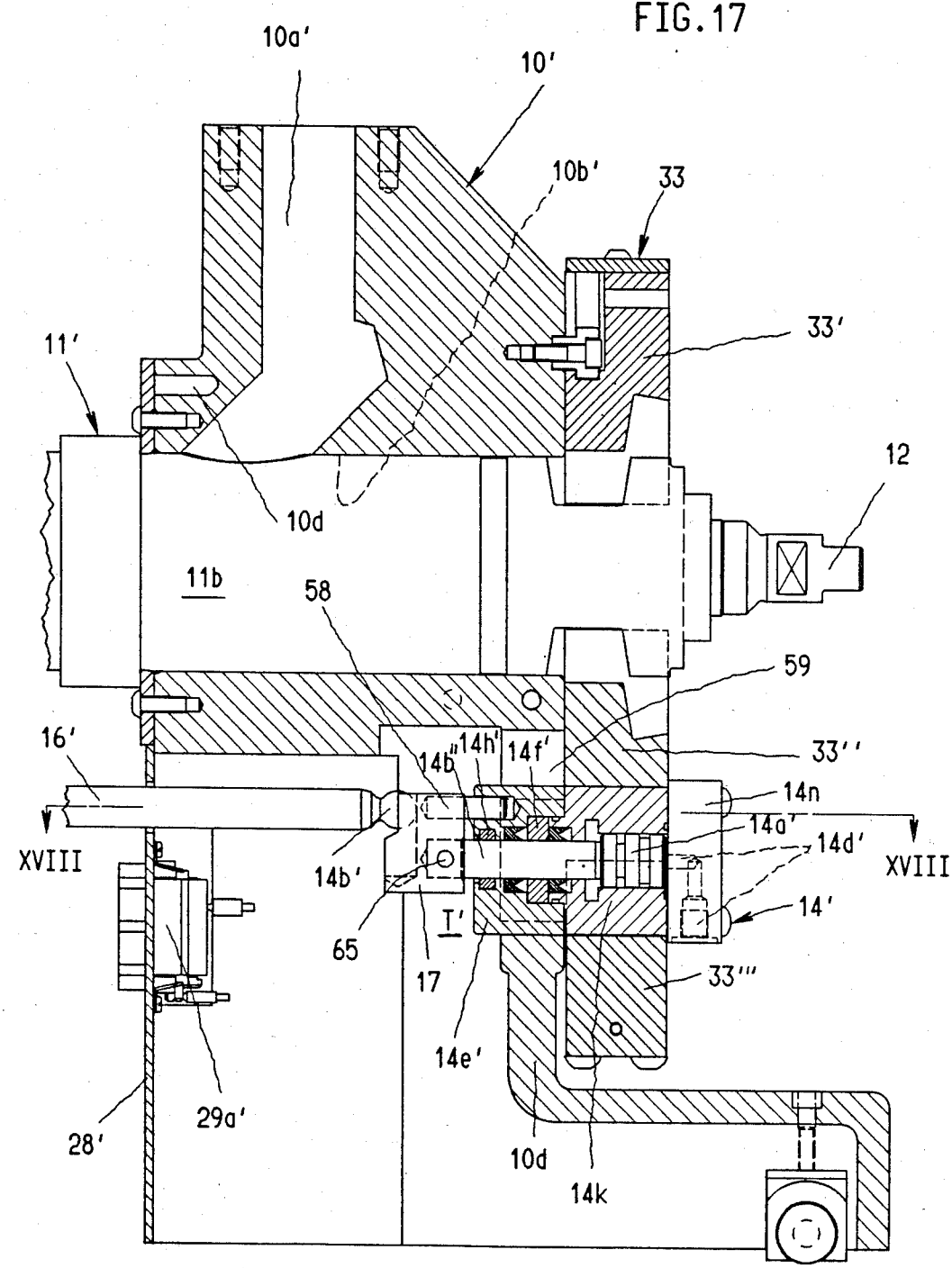
FIG. 17 is a sectional side elevational detail of the embodiment shown in FIG. 14, showing a nozzle control cylinder in an uncoupled position.

Referring in particular to FIGS. 14, 16 and 17, the plasticizing cylinder 11' may be automatically locked into the central bore 10b' of the carrier block 10' by means of two diametrically arranged and radially guided, hydraulically driven slides 33', 33" and 33'". The shifting device for the slides is vertically oriented. The nozzle control cylinder 14' is connected with the lower two-part slide 33", 33'" to form therewith a single movable unit.

The cylinder block 14k of the control cylinder 14' is flush with both the rearward planar surfaces as well as the frontal planar surfaces of the slides 33" and 33'". The frontal cylinder closure 14e' has the same diameter as the cylinder block 14k and is connected with the coupling element 17 by means of a horizontal securing pin 58 for preventing a relative rotation between the coupling element 17 and the cylinder block 14k.

The coupling device is situated within the niche T' of the carrier block 10' and is bounded at the rear by a wall-like, vertically extending part 10d of the carrier block 10' and is bounded in the front by the terminal-carrying plate 28'. The control cylinder unit 14' is guidable in a vertically extending opening 59 of the wall-like part 10d of the carrier block 10' in case it is moved with the slide 33", 33'" in a vertical direction for a coupling to or an uncoupling from the nozzle actuating rod 16'. Thus, the locking motion or unlocking motion of the slides 33', 33" and 33'" (for locking the plasticizing cylinder 11' to or unlocking it from the carrier block 10') is utilized for actuating the coupling device. As seen in FIG. 18, the slides are, with the aid of hydraulic cylinders 60, movable against a spring force from the locking position. The construction of the slides 33', 33" and 33'" as well as the associated drive mechanisms for the axial locking and unlocking of the plasticizing cylinder in the carrier block are disclosed in German Application No. P 37 35 769.7 and need therefore not be described in detail. FIG. 18 shows that two hydraulic cylinders 60 with pistons 60b and piston rods 60a are integrated in the slides symmetrically to the vertical symmetry plane c—c of the injection molding unit. The lower slide 33", 33'" is formed of two congruent components which are connected with one another by means of connecting elements 62. Upon a vertical motion of the slide, the frontal cylinder closure 14e', provided with a radial flange, is guided in the zone of the recess 59 in the wall-like portion 10d of the carrier block 10'. As it may be observed in FIGS. 16, 17 and 18, the nozzle-side cylinder chamber is sealed by means of a sealing element 14h' as well as sealing rings which lie against an annular disc 14f situated in the cylinder closure 14e'.

Figure 15:
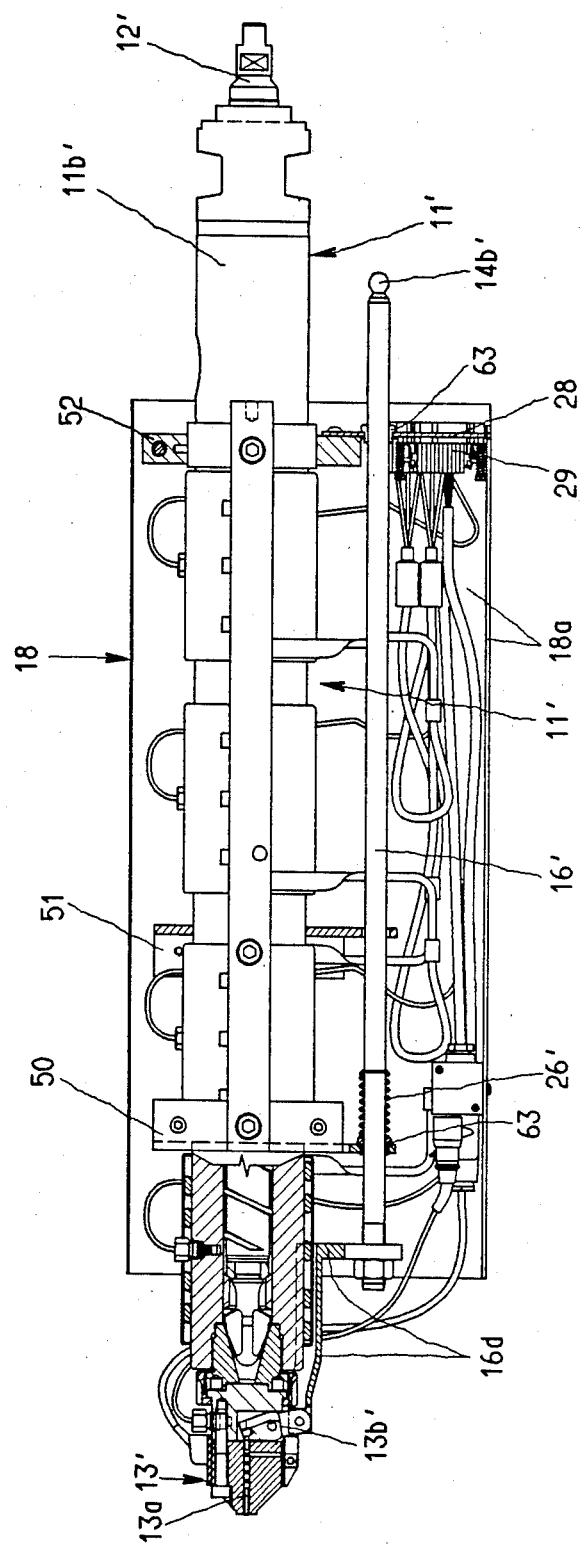
FIG. 15 is a longitudinal elevational view, partially in section, of a plasticizing unit of FIGS. 14, shown separated from the injection molding unit.

The coupling element 17 is articulated to the piston rod 14b" with the aid of a pin 65. The rear cylinder closure 14n lies against the rearward planar surface of the slide 33", 33'" as seen in FIG. 18. The rear cylinder closure 14n also serves as a distributor plate by means of which the pressure medium is introduced via the nipples 14c' and 14d' into the rearward or forward cylinder chamber of the control cylinder 14'. The linear force-transmitting rod 16' is guided in armor elements 50, 51 and 52 of the plasticizing cylinder 11' and is articulated by means of an angled connecting member 16d with the two-armed lever 13b' which, in turn, is pivotally supported in the nozzle 13' and engages the nozzle needle 13a'. The spring 26' which is a coil spring surrounding the rod 16' and which presses the nozzle needle 13a' into its closed position, is, as seen in FIG. 15, supported in a guide sleeve 63 of the armor element 50 and engages, via a circlip, the rod 16' which at its free end terminates in a coupling head 14b'. The latter cooperates with the coupling element 17 articulated to the piston rod 14b" in the same manner as the coupling head 14b' cooperates with the coupling element 17 of the embodiment, described in more detail in connection with FIGS. 7-12. It is to be noted that the coupling device according to the second embodiment shown in FIGS. 14-18 operates as a kinetic reverse of the coupling device according to FIGS. 1-13, inasmuch as it is the control cylinder 14' which is moved with the coupling element 17 to establish a coupling or uncoupling of the connection while the coupling head 14b' arranged on the force-transmitting rod 16' is not movable radially.

Compared to the first embodiment shown in FIGS. 1-13, the second embodiment of FIGS. 14-15, a conversion of the basic variant (with open nozzle) into a retrofitted variant (with shutoff nozzle) is even simpler and is just as well adapted for a program-controlled replacement of the plasticizing cylinder as the first embodiment. After replacement of the nozzle, only the force-transmitting rod 16' provided with the coupling head 14b' and the control cylinder 14' provided with the coupling element 17 need to be inserted into the fitting and guiding seats provided for this purpose.

The present disclosure relates to subject matter contained in Federal Republic of Germany Patent Application No. P 37 08 434.8 (filed Mar. 16th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine including
    a plasticizing cylinder having a front terminus, a rear terminus and a longitudinal axis;
    a feed screw rotatably and axially shiftably disposed in said plasticizing cylinder generally coaxially therewith and being arranged for advancing a plastic material within said plasticizing cylinder towards said front terminus;
    a shutoff nozzle mounted at said front terminus and being arranged for discharging the plastic material from the plasticizing cylinder into a mold assembly; the shutoff nozzle including needle means movable into open and closed positions for allowing and, respectively, blocking discharge of material through said shutoff nozzle;
    a shutoff nozzle control means for moving said needle means into one of the positions thereof;
    a carrier block including means defining a bore therein for receiving said rear terminus of said plasticizing cylinder;
    locking means supported in said carrier block and having a locking position for locking said rear terminus to said carrier block and a releasing position for allowing withdrawal of the rear terminus from said bore; and
    drive means for moving said plasticizing cylinder out of said bore and away from said carrier block in a direction parallel to said longitudinal axis of said plasticizing cylinder;
    the improvement wherein said shutoff nozzle control means comprises
    (a) a first power device supported by said carrier block;
    (b) a force-transmitting element connected to said needle means of said shutoff nozzle and extending therefrom to said first power device; and
    (c) coupling means including a movable coupling mechanism for placing said force-transmitting element into an engaged position or a disengaged position relative to said first power device, whereby in said disengaged position said plasticizing cylinder is, together with said force-transmitting element, movable away from said first power device and said carrier block; said coupling means including a second power device connected to said coupling mechanism for placing said coupling mechanism into said engaged or disengaged position.

2. An injection molding machine as defined in claim 1, wherein said first and second power devices have means for generating generally linear output forces having respective first and second directions being perpendicular to one another.

3. An injection molding machine as defined in claim 1, wherein said force-transmitting element is a rod supported by said plasticizing cylinder.

4. An injection molding machine as defined in claim 1, wherein said force-transmitting element is supported by said plasticizing cylinder; said injection molding machine further comprising a spring supported by said plasticizing cylinder and being connected to said force-transmitting element; said spring continuously urging said needle means into said closed position.

5. An injection molding machine as defined in claim 1, wherein said first power device includes a hydraulic cylinder unit having a cylinder chargeable with hydraulic pressure, a piston slidably disposed in said cylinder and a piston rod attached to said piston.

6. An injection molding machine as defined in claim 5, further comprising means defining a niche in said carrier block radially adjacent said bore; said first power device being accommodated in said niche.

7. An injection molding machine as defined in claim 6, further comprising a terminal-carrying closure plate attached to said carrier block and closing off said niche.

8. An injection molding machine as defined in claim 6, wherein said carrier block has a vertical symmetry plane; said niche being situated symmetrically to said vertical symmetry plane.

9. An injection molding machine as defined in claim 5, wherein said force-transmitting element and said piston rod have ends oriented towards, and being adjacent one another when said rear terminus of said plasticizing cylinder is accommodated in said bore of said carrier block; further wherein said coupling mechanism includes interengageable and separable first and second coupling parts attached to said ends of said force-transmitting element and said piston rod; said plasticizing cylinder and said carrier block having a common vertical symmetry plane; said first and second coupling parts being each symmetrically arranged relative to said symmetry plane and being relatively movable into an interengaged or a separated state in a direction generally perpendicular to the longitudinal axis of said plasticizing cylinder.

10. An injection molding machine as defined in claim 9, wherein said first coupling part comprises a coupling head carried at an end of said piston rod; said second coupling part being carried by an end of said force-transmitting element and having a coupling recess arranged for interlockingly receiving said coupling head in said engaged position.

11. An injection molding machine as defined in claim 10, wherein said force-transmitting element is a rod; further comprising a sled supported in said plasticizing cylinder for movement generally perpendicularly to said longitudinal axis of said plasticizing cylinder; said rod being connected to said sled for moving said rod, together with said second coupling part relative to said first coupling part carried by the piston rod of said first power device; said injection molding machine further comprising a spring urging said sled in a direction for establishing said engaged position; said second power device being connectable to said sled for moving said sled, together with said rod and said second coupling part in a direction to establish said disengaged position.

12. An injection molding machine as defined in claim 11, further comprising a protective casing surrounding said plasticizing cylinder and being attached thereto; said sled being supported on said casing; said casing having a horizontal bottom wall having an aperture aligned with said sled; said second power device being stationarily supported externally of and apart from said plasticizing cylinder; said second power device having an output member movable parallel to the direction of motion of said sled; said output member being arranged for engaging said sled through said aperture.

13. An injection molding machine as defined in claim 12, wherein said output member is arranged for projecting into said aperture for preventing motion of said plasticizing cylinder in a direction parallel to the longitudinal axis thereof.

14. An injection molding machine as defined in claim 12, wherein said second power device comprises an additional hydraulic cylinder unit, said additional hydraulic cylinder unit including an additional cylinder chargeable with hydraulic pressure, an additional piston slidably accommodated in the additional cylinder and an additional piston rod attached to said additional piston and constituting said output member of said second power device.

15. An injection molding machine as defined in claim 1, wherein said locking means comprises a slide supported for a motion perpendicular to said longitudinal axis of said plasticizing cylinder for assuming said locking position or said releasing position; said first power device being mounted on said slide for moving therewith as a unit; said locking means further comprising actuating means for moving said slide; said actuating means constituting said second power device.

16. An injection molding machine as defined in claim 15, wherein said first power device includes a hydraulic cylinder unit having a cylinder chargeable with hydraulic pressure, a piston slidably disposed in said cylinder and a piston rod attached to said piston.

17. An injection molding machine as defined in claim 16, wherein said force-transmitting element and said piston rod have ends oriented towards, and being adjacent one another when said rear terminus of said plasticizing cylinder is accommodated in said bore of said carrier block; further wherein said coupling mechanism includes interengageable and separable first and second coupling parts attached to said ends of said force-transmitting element and said piston rod; said plasticizing cylinder and said carrier block having a common vertical symmetry plane; said first and second coupling parts being each symmetrically arranged relative to said symmetry plane and being relatively movable into an interengaged or a separated state in a direction generally perpendicular to the longitudinal axis of said plasticizing cylinder.

18. An injection molding machine as defined in claim 17, wherein said first coupling part comprises a coupling head carried at the end of said force-transmitting element; said second coupling part being carried by the end of said piston rod and having a coupling recess arranged for interlockingly receiving said coupling head in said engaged position.

19. An injection molding machine as defined in claim 18, wherein said cylinder is provided in a cylinder block received in said slide; said cylinder block and said slide each having opposite faces; the opposite faces of said cylinder block being substantially flush with respective opposite faces of said slide; further comprising a cylinder closure mounted on said cylinder block and oriented toward said force-transmitting element; and a securing pin extending spaced from and parallel to said piston rod and connecting said cylinder closure with said second coupling part for preventing rotation of said second coupling part.

20. An injection molding machine as defined in claim 15, wherein said carrier block has a niche having a rear side bounded by a generally vertical wall of the carrier block and a front side bounded by a terminal-carrying closure plate attached to said carrier block; said movable coupling mechanism being accommodated in said niche and said vertical wall being provided with an aperture through which said cylinder block projects and which allows a vertical displacement of said cylinder block with respect to said vertical wall when said cylinder block is displaced, as a unit, with the slide of said locking means.

* * * * *